Charles H. Wakelee  Dessicating Apparatus.
No. 119,903.  Patented Oct. 10, 1871.
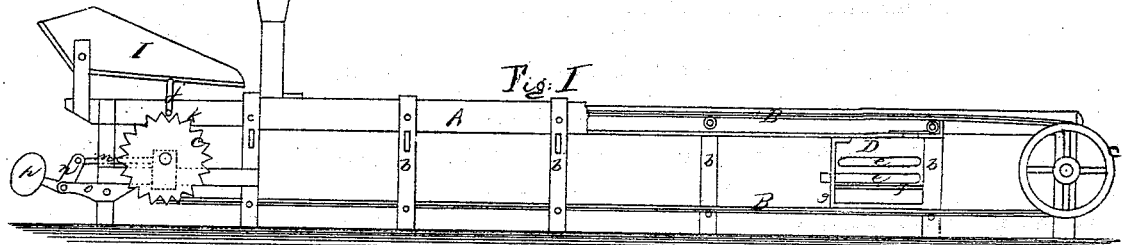
Fig. I
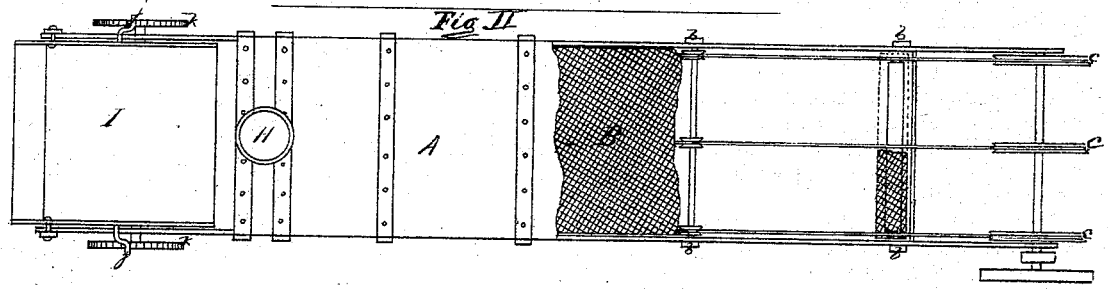
Fig. II
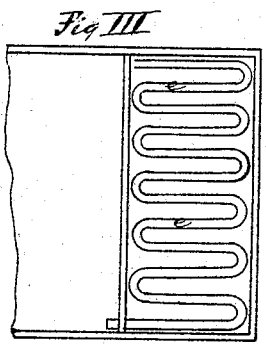
Fig. III
Witnesses
J. L. Boone
Benj'n. C. Fabre.
Inventor.
Charles H. Wakelee
by Dewey & Co
His Attorneys

UNITED STATES PATENT OFFICE.

CHARLES H. WAKELEE, OF SAN FRANCISCO, CALIFORNIA.

IMPROVEMENT IN DRIERS.

Specification forming part of Letters Patent No. 119,903, dated October 10, 1871.

*To all whom it may concern:*

Be it known that I, CHARLES H. WAKELEE, of city and county of San Francisco, State of California, have invented an Improvement in Fruit-Drying Apparatus; and I do hereby declare the following description and accompanying drawing are sufficient to enable any person skilled in the art or science to which it most nearly appertains to make and use my said invention or improvements without further invention or experiment.

My invention relates to improvements in apparatus for desiccating fruit and vegetables after they have been cut into thin shavings or slices and other substances requiring to be dried; and it consists in feeding the prepared fruit automatically upon an endless woven or perforated band or apron, which carries the fruit with it into and through a shallow chamber, through which heated air is drawn in a direction opposite to the movement of the endless band. The heated air in its passage extracts the moisture from the fruit or vegetables, as the case may be, so that after it has been once passed through the chamber it will be in a fit condition to be packed or otherwise disposed of without deterioration. My improvements also consist in an improved arrangement whereby I am enabled to produce a current of heated air in the chamber by means of an ordinary draught-flue.

In order to more fully illustrate and explain my invention, reference is had to the accompanying drawing forming a part of this specification, in which—

Figure I is a side elevation of my fruit-drier. Fig. II is a plan of same. Fig. III is a view of the heating-coil.

A represents a shallow chamber of any desired length and width, which is mounted upon suitable legs $b$ or other frame-work. B is an endless carrying-belt or band, either perforated or made of wire cloth or other heat-resisting material. This belt or band is arranged horizontally, passing around a drum or pulley, $c\ c$, at each end, so that its upper portion will pass longitudinally through the chamber A. A box, D, is arranged under one end of the chamber A so as to communicate with the chamber above, in which is coiled a heating-pipe, $e$. Directly below this coil is stretched a fine wire-gauze, $f$, and below the gauze in the front of the box is an opening, $g$, through which air enters into the box. At the opposite end of the chamber A is a chimney or stack, H, which is built to a sufficient height to cause a draught strong enough to draw the heated air from the box D through the chamber A, so as to dry the fruit or vegetables which are being passed through it. At the feeding-end of the endless band is a scoop-shaped table or hopper, I, one end of which is loosely attached to the frame which supports the belt. From the forward end upon each side depend short legs $j$, which rest upon a ratchet or spurred wheel, $k$, upon each end of the shaft which carries the drum or pulleys $c\ c$. The revolution of this cam-wheel will then give a shaking motion to the hopper or scoop, which will feed the fruit slowly and thinly upon the moving belt. In order to take up the slack of the carrying-belt, caused by its expansion when heated, a lever, $m$, has one end attached to the box in which the shaft revolves which carries one of the drums or pulleys, while its opposite end is attached to one arm of a bell-crank, $n$. The angle of the bell-crank is pivoted to any suitable projection, $o$, and a weight, $p$, at the extremity of its opposite arm serves to draw upon the shaft and keep the belt taut.

In operation a steam-engine or other suitable power may be employed to drive the belt and operate the machine. The box D is heated by admitting steam, or hot water if more convenient, into the coil of pipes $e$. The stack being then of the proper height to produce the desired current or draught, air will be drawn into the box through the opening $g$ and through the screen $f$, which will distribute it equally. It then becomes heated by its contact with the coil and passes through the chamber from end to end both above and below the band, thus drying the fruit which is being passed through the chamber, after which the dried fruit is dumped from the band into a suitable receptacle at the opposite end of the frame. The top of the chamber A can be removable, if desired, so that the interior can be examined if necessary.

By this construction and arrangement I provide a drying apparatus that will perform its work automatically so as to do away with the necessity of employing a number of hands to attend to the fruit during the operation of drying.

Having thus described my invention, what I claim, and desire to secure by Letters Patent, is—

1. The box D with its inclosed coiled pipes *e*, wire-gauze *f*, and opening *g*, in combination with the chamber A and stack H, substantially as and for the purpose above described.

2. The connecting-lever *m*, in combination with the weighted bell-crank *n* pivoted at *o*, substantially as and for the purpose above described.

3. An apparatus for desiccating purposes, having the chamber A, horizontally-moving endless skeleton band B, heating-box D constructed as described, stack H, and automatically-feeding hopper I, all combined and arranged as above specified.

In witness that the above-described invention is claimed by me I have hereunto set my hand and seal.

CHARLES H. WAKELEE. [L. S.]

Witnesses:
BENJN. C. FABRE,
J. L. BOONE.